(12) United States Patent
Starns et al.

(10) Patent No.: US 8,072,650 B1
(45) Date of Patent: Dec. 6, 2011

(54) AUTOMATED FOCUS ADJUSTMENT USING A VARYING LIGHT PATTERN

(75) Inventors: Alexander T. Starns, Saint Paul, MN (US); Wesley Grass, Boulder Creek, CA (US)

(73) Assignee: Google Inc., Mountain View, CA (US)

( * ) Notice: Subject to any disclaimer, the term of this patent is extended or adjusted under 35 U.S.C. 154(b) by 1000 days.

(21) Appl. No.: 12/013,370

(22) Filed: Jan. 11, 2008

(51) Int. Cl.
*H04N 1/40* (2006.01)

(52) U.S. Cl. ........ 358/447; 358/406; 358/474; 358/497; 358/504; 348/348; 348/349; 348/350

(58) Field of Classification Search ............... 348/348; 358/473–490
See application file for complete search history.

(56) References Cited

U.S. PATENT DOCUMENTS

| | | | | |
|---|---|---|---|---|
| 5,760,925 A | * | 6/1998 | Saund et al. | 358/497 |
| 5,886,342 A | * | 3/1999 | Matsui | 250/208.1 |
| 7,388,693 B2 | * | 6/2008 | Ahmed et al. | 358/512 |
| 7,463,772 B1 | * | 12/2008 | Lefevere et al. | 382/215 |
| 7,639,406 B1 | * | 12/2009 | Proudfoot et al. | 358/474 |
| 7,660,458 B1 | * | 2/2010 | Saric | 382/154 |
| 7,826,736 B2 | * | 11/2010 | Strandemar et al. | 396/106 |
| 2004/0131244 A1 | * | 7/2004 | Nehse et al. | 382/141 |
| 2006/0256229 A1 | * | 11/2006 | Wernersson | 348/348 |
| 2006/0262154 A1 | * | 11/2006 | Uchiyama et al. | 347/19 |
| 2009/0052792 A1 | * | 2/2009 | Curtis | 382/254 |

* cited by examiner

*Primary Examiner* — King Poon
*Assistant Examiner* — Richard Zhu
(74) *Attorney, Agent, or Firm* — Fenwick & West LLP

(57) ABSTRACT

Systems and methods for automatically focusing an image capture device on a page of a document object. A predetermined light pattern is projected onto the page being imaged. The light pattern varies as a function of the separation of the page being imaged from the end page. The light pattern projected onto the page being imaged is sensed. Based on the sensed light pattern, the image capture device is focused on the page being imaged.

19 Claims, 10 Drawing Sheets

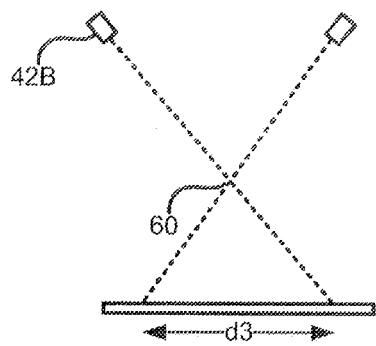
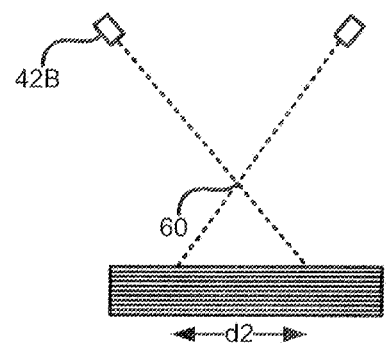
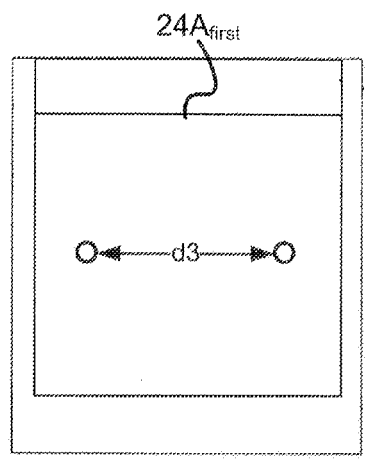
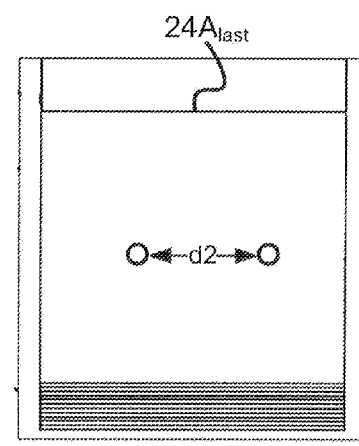
FIG. 3A  FIG. 3B

AUTOMATED FOCUS ADJUSTMENT USING A VARYING LIGHT PATTERN

FIELD OF THE INVENTION

The present invention relates generally to the imaging of document objects. More specifically, it relates to automatically focusing on the pages of a document object by using a light pattern to detect variations in the position of the pages.

BACKGROUND

Scanning books, magazines, and other printed material into digital form has become more common with the advent of improved imaging, storage and distribution techniques. Although many types of unbound printed material can generally be scanned with relative ease using automatic page-feeding mechanisms such as those commonly found on digital copiers and scanners, some types of unbound documents and most types of bound documents present additional challenges. Bound documents include not only books, but also periodicals, manuscripts, pamphlets, brochures, newspapers, manuals, and any other document having a bound edge. Many institutions, such as the Library of Congress, universities, bookstores, and private enterprises have vast collections of bound documents. By converting these documents into electronic form, such institutions can reduce the cost of storage, facilitate remote access, enable simultaneous access by multiple users, facilitate search and retrieval of information, and/or protect information in rare or out-of-print works from loss or destruction.

Once the content of a bound document is scanned, the recorded image can be manipulated or otherwise processed. Digitally recorded bound documents can be reformatted, supplemented with additional information, compressed, and/or processed with OCR (optical character recognition) software, and indexed to facilitate electronic search. Thus, scanning and recording of bound documents facilitates the creation of digital libraries that can be remotely and simultaneously accessed and searched by multiple users.

Various mechanisms have been developed to enable the scanning of bound documents. For example, a traditional flat-bed platen scanner scans bound documents in a face-down position. However, for best results, a flat-bed scanner typically requires the application of force to the spine or binding of the bound documents to insure that they come within the scanner's depth of field. Such force can damage the spine region of the document. In addition, using the flat-bed platen can be tedious and time-consuming, as the bound documents typically must be lifted and repositioned after each page is scanned. Further, image quality is often poor due to loss of focus, uneven illumination, and distortion caused by page curvature in the vicinity of the binding.

An alternative to the traditional flat-bed platen scanner is a platen-less scanner that captures image data from a bound document in a face-up position. Such scanners typically do not require application of additional stress to the binding region of a bound document, since the document is scanned in its natural, face-up position. Some such scanners make use of automatic page turning apparatuses. In addition, optics and software have been developed for compensating for the image-distortion resulting from the inherently curved surfaces typical of open, edge-bound books that are not subjected to potentially damaging flattening pressure. For example, the curvature of a document's pages may be detected using a curvature detector, with a linear light source for defining a brightness distribution. The detected curves of the page can then be used to approximately rectify image signals received from the document scanner.

However, the pages of the bound document may become out of focus during the course of the scanning, for example as the pages are flipped. Thus, it would be desirable to provide a system for capturing images of the pages of a bound document (and other types of document objects) while automatically and accurately maintaining focus within the image frame of the camera.

SUMMARY

In one aspect of the invention, a document-imaging device designed to capture images of pages of document objects also has automatic focus capability. The device includes a light pattern source, an optical sensor and an automatic focus mechanism. The light pattern source projects a predetermined light pattern onto a page of the document object being imaged. Due to the thickness of the document object, different pages of the document object are separated by different thicknesses from an end page of the document object. The light pattern varies as a function of the separation of the page being imaged from the end page. The optical sensor senses the light pattern projected onto the page being imaged. The automatic focus mechanism focuses an image capture device on the page being imaged, based on the sensed light pattern.

In another aspect of the invention, a method for automatically focusing an image capture device on a page of a document object includes the following steps. A predetermined light pattern is projected onto the page being imaged. The light pattern varies as a function of the separation of the page being imaged from the end page. The light pattern projected onto the page being imaged is sensed. Based on the sensed light pattern, the image capture device is focused on the page being imaged.

BRIEF DESCRIPTION OF THE DRAWING

FIGS. 3A and 3B illustrate the use of convergent light beams to detect a change in thickness.

DETAILED DESCRIPTION OF THE EMBODIMENTS

Systems and methods for automatically focusing on the pages of a document object being imaged by using variations in a predetermined light pattern projected onto the pages, as feedback for an automatic focus mechanism. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purposes of clarity, details relating to technical material that is known in the technical fields related to the invention have not been described in detail so as not to unnecessarily obscure the present invention.

Figure 1A:
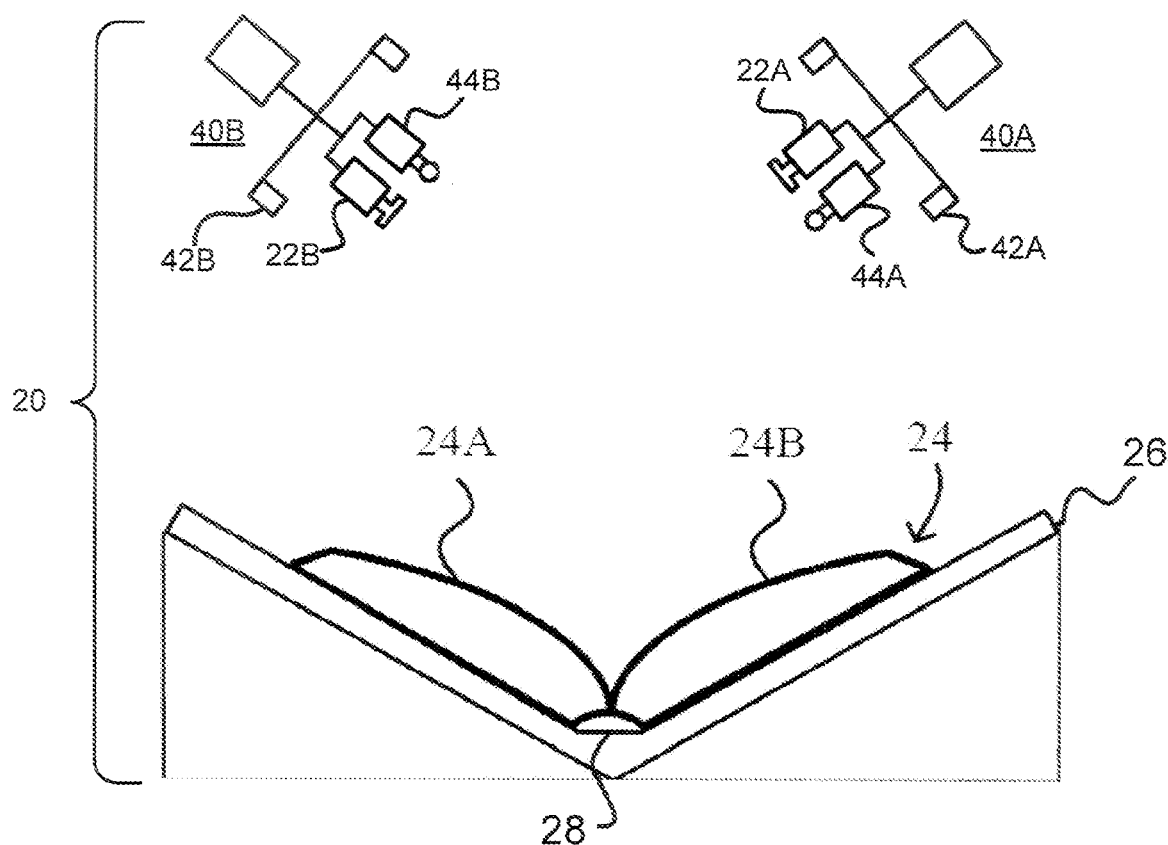
FIG. 1A is a schematic diagram of an automatic focus document-imaging system.
Figure 1B:
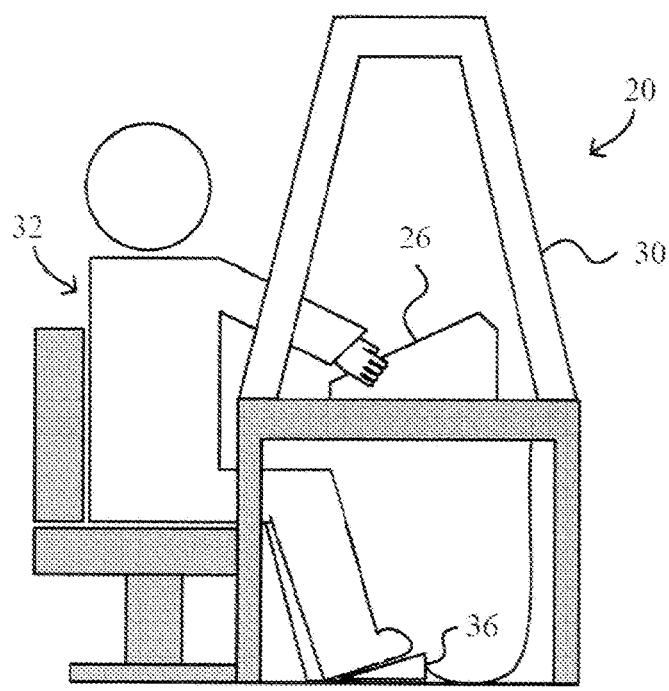
FIG. 1B is a schematic diagram illustrating an operator using an automatic focus document-imaging system.

FIG. 1A is a schematic diagram of an exemplary embodiment of an automatic focus document-imaging system 20 and FIG. 1B is a schematic diagram illustrating an operator 32 using the automatic focus document-imaging system 20. The automatic focus document-imaging system 20 generally includes one or more cameras 22 (or other image capture devices). The example of FIG. 1A includes two high resolution cameras 22A, 22B, each of which captures an image of a corresponding facing page 24A, 24B of a document object 24 being imaged. Note that the system 20 is not required to always operate both cameras 22 to always capture two pages 24A, 24B. The system 20 can be operated in a mode that captures one page at a time instead, for example, only camera 22B capturing pages 24B. This may be beneficial for document objects that do not have facing pages, for example a stack of posters or maps.

In FIG. 1A, the document object 24 is an open bound document object, such as a book, resting in a support such as an angled cradle 26. This cradle 26 provides a generally flat gutter 28 on which the binding of the book 24 rests. It is to be understood that although a book is used herein in describing the automatic focus document-imaging system, the principles described herein may also be used to image other types of document objects, including for example periodicals, manuscripts, pamphlets, maps, posters, brochures, newspapers and manuals. Other types of document holders may also be used. The system 20 may include a housing 30 or other structure to house or otherwise support the cameras 22, lighting mechanism, and/or other components. In one design, the operator 32 triggers the camera(s) 22 by depressing a foot pedal 36.

The automatic focus document-imaging system 20 also includes an automatic focus mechanism 40 that can adjust the focus of the cameras 22 to keep the pages 24 in focus. In the example of FIG. 1A, the automatic focus mechanism 40 achieves this by moving the cameras 22 closer or farther from the pages 24 being imaged. Other automatic focus mechanisms can also be used. For example, the document object 24 itself can be moved closer or farther from the cameras 22. Alternately, the cameras 22 can be optically adjusted to change their point of focus.

Returning to the current example, if the cameras 22 and the book 24 remain stationary relative to each other, as the pages of the book 24 are turned, the cameras 22 can become out of focus since the cameras have a finite depth of field. The cameras 22 become out of focus because the pages from the right side of the book 24 are turned and positioned onto the left side of the book 24, causing a change in the distance between the cameras and the pages being imaged. With each page turn, one side of the book 24 becomes thinner and the other side of the book 24 becomes thicker. Put in another way, the thickness separating the page being imaged and the end page of the document object (e.g., the front or back cover of the book) changes as the pages are turned.

The automatic focus mechanism 40 moves the cameras to accommodate this change in thickness. By moving the camera, the pages being imaged are maintained within the depth of field of the cameras. The automatic focus mechanism 40 uses one or more light pattern sources 42 and one or more optical sensors 44 as a feedback mechanism for the changing thickness. The light pattern sources 42 project a predetermined light pattern onto the page being imaged. The light pattern on the page varies as the height between the camera and page being imaged changes. The light pattern varies as a function of the changing thickness. The optical sensor detects the light pattern projected onto the page being imaged. This inherently captures information about the thickness between the page being imaged and the end page. Based on this information, the automatic focus mechanism 40 adjusts the camera position to keep it in focus.

In one approach, the light pattern source 42 moves with the camera 22. Thus, there is one light pattern that corresponds to the camera 22 being in focus and the automatic focus mechanism 40 adjusts the position of the light pattern source 42 (and, therefore, also the camera 22) so that this "in-focus light pattern" is the one projected onto the page being imaged. As pages are turned, the projected pattern will change and the automatic focus mechanism 40 adjusts the position to return the projected pattern to the "in-focus light pattern."

In a different approach, the light pattern source 42 is stationary but the camera 22 moves. In this case, different projected light patterns correspond to different thicknesses between the page being imaged and the end page. The optical sensor 44 senses the projected light pattern. Based on this, the automatic focus mechanism 40 adjusts the position of the camera 22 to the correct position for the thickness corresponding to the sensed light pattern.

Figure 2A:
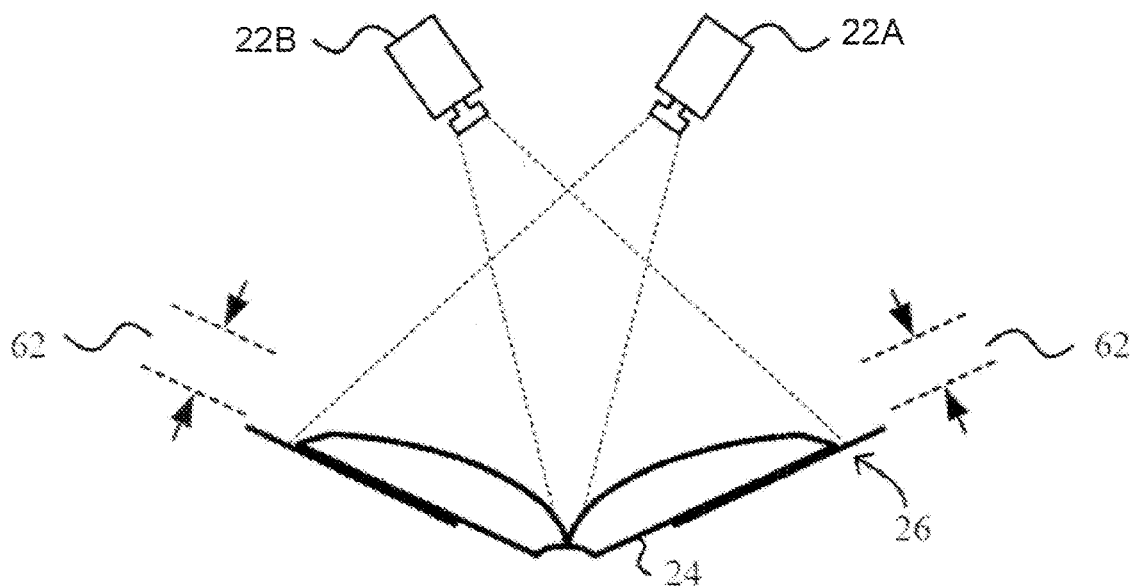
FIG. 2A is a schematic diagram illustrating the depth of field of the cameras in an automatic focus document-imaging system.
Figure 2B:
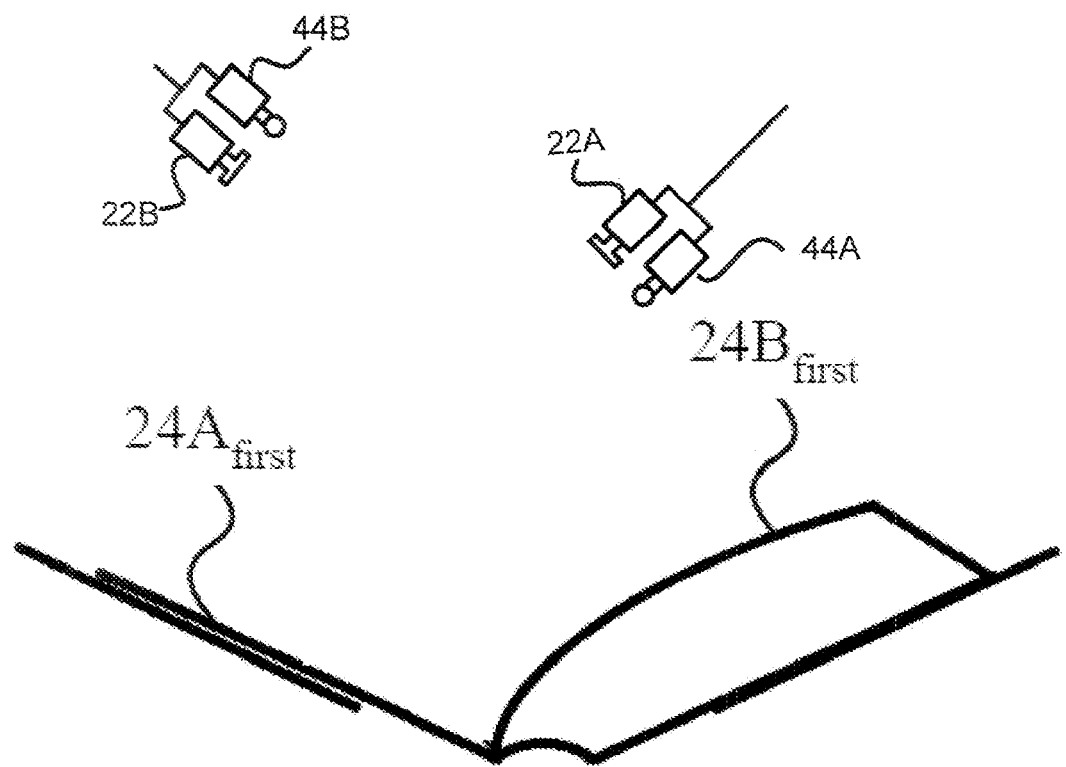
FIGS. 2B and 2C are schematic diagrams illustrating a first set of facing pages and a last set of facing pages of a book, respectively, where the cameras are positioned to maintain the pages being imaged within focus.
Figure 2C:
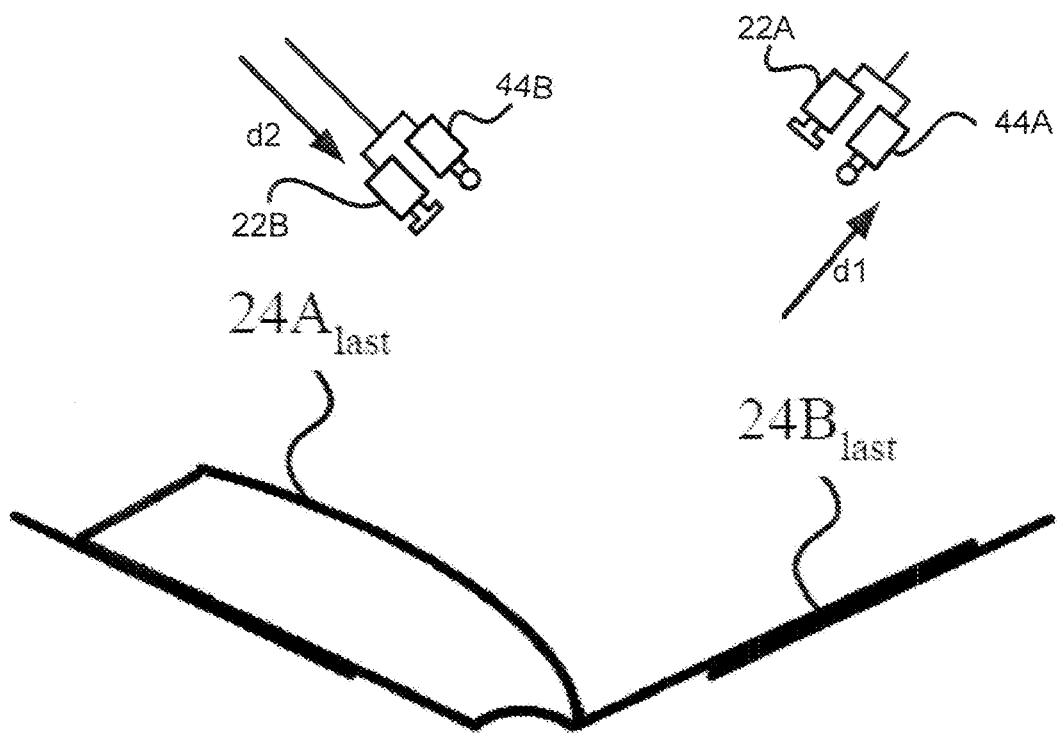

FIGS. 2A-2C provide further explanation of the depth of field of the cameras 22. FIG. 2A is a schematic diagram illustrating the depth of field 62 of the cameras 22 according to one embodiment. The exact position and size of the depth of field 62 may depend on the sensor, lens and aperture of the cameras 22 as well as the distance from the camera to the page being imaged and the acceptable "circle of confusion" allowed on the sensor. Preferably, the depth of field 62 ranges from 0.75" to 2". With the automatic focus mechanism, each page being imaged preferably is maintained around the center of the allowable depth of field for the best image sharpness.

FIGS. 2B and 2C are schematic diagrams illustrating the first set of facing pages $24A_{first}$, $24B_{first}$ and a last set of facing pages $24A_{last}$, $24B_{last}$ of a book, respectively, where the cameras 22A and 22B are positioned accordingly so as to maintain the page being imaged within focus according to one embodiment. In FIG. 2C, camera 22A and camera 22B are moved by a distance d1 and d2 respectively relative to the original position of the cameras in FIG. 2B. The cameras are moved in order to keep the pages in focus as the thickness of pages on each side has changed. In FIG. 2B, the "A" side of the book (i.e., the side with page $24A_{first}$) is thinner than the "B" side of the book. As a result, the cameras 22A and 22B are positioned at different locations in order to keep pages $24A_{first}$ and $24B_{first}$ at the proper focus, with camera 22A closer to the book 24 than camera 22B. In FIG. 2C, as a result of the changing thicknesses, camera 22A moves away from page $24A_{last}$ by a distance d1 and camera 22B moves closer to page $24B_{last}$ by a distance d2 in order for each camera to keep their respective page at the proper focus. In many cases, d1 will equal d2. In addition, by moving cameras 22A and 22B relative to book 24, the distance to the page being imaged is maintained and, therefore, the image magnification (i.e., the size of the image of the page) is also maintained.

FIGS. 3A and 3B are one example of a light pattern. In this case, convergent light beams are used as the light pattern to detect changes in thickness. In this example, the light pattern sources 42 are infrared lasers and the corresponding optical sensors 44 also operate in the infrared spectrum. The cameras 22, however, operate in the visible spectrum. One advantage is that the projected light pattern falls outside the spectral sensitivity of the cameras 22. Therefore, the images of the pages 24 captured by cameras 22 will not contain images of the projected light pattern.

The infrared lasers project two infrared laser beams onto the page 24A to produce a predetermined light pattern that consists of two laser spots separated by a distance. In this example, the light pattern sources 42 are not moved with the cameras. Since the laser beams travel at angles to each other, the distance between the two laser spots varies as the thickness of document object varies, as shown in FIGS. 3A and 3B.

In addition, in this example, the laser beams of the light source 42 are projected so that they always cross at a convergence point 60 before hitting the book pages, regardless of the overall thickness of the book. One advantage of this approach is that farther separated spots will always correspond to a thinner number of pages. In some cases, the laser beams may not literally intersect since they may not lie exactly in one plane. Rather, they may be separated by a small distance but still lie substantially within a plane. For example, in FIGS. 3A and 3B, one of the laser beams may be slightly "in front of" (i.e., closer to the viewer) than the other laser beam. In that case, if the laser beams were projected onto a common plane, their projections would intersect.

The convergent laser beams are used because a change in the separation distance between the two laser spots correlates to a change in thickness of the separation between the page being imaged and the end page. In this examples, the two laser spots are aligned parallel to the book binding, so that even if a page is curved (e.g., the portion of the page close to the binding is at a different height than the portion away from the binding), the two laser spots will be approximately at the same height. FIG. 3A shows a side and top view of page 24A$_{first}$ being imaged. The infrared convergent laser beams produce two laser spots on the page. The laser spots are separated by a distance d3. FIG. 3B shows the side view and top view of page 24A$_{last}$ being imaged. Here, the thickness of the book has increased, which has caused the separation distance d4 between the two laser spots to change. The distance d4 in FIG. 3B is less than the distance d3 in FIG. 3A, which, if the camera is not moved, means that the camera 22 is closer to the book page 24.

Continuing this example, the optical sensor 44 is an infrared camera that captures images of the infrared laser spots projected onto the page 24. In one approach, the infrared camera 44 includes an image array with pixels that are smaller than the image of the laser spot. That is, the image of the laser spot covers multiple pixels of the image array. As a result, the automatic focus mechanism 40 can estimate the center of each laser spot to sub-pixel resolution. The distance between the two estimated centers can then be calculated. The calculated distance can be used to determine if there has been a change in the thickness position of the page 24 being imaged. If so, the automatic focus mechanism 40 can adjust the focus of the camera 22 accordingly, for example by moving the camera 22 closer or farther from the page 24.

Figure 8A:
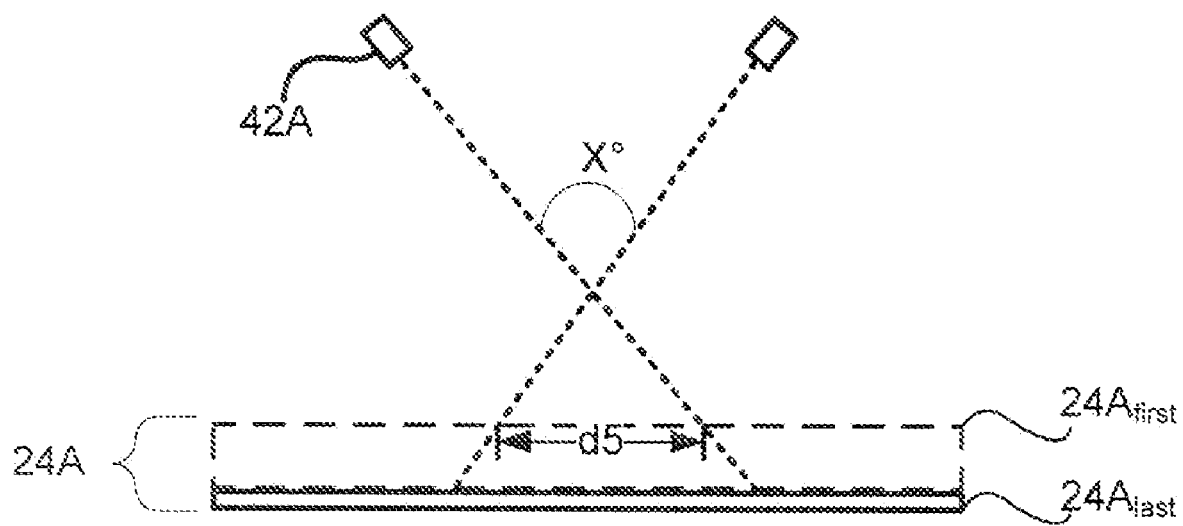
FIGS. 8A and 8B illustrate how the angle between convergent laser beams affects the sensitivity to variations in thickness.
Figure 8B:
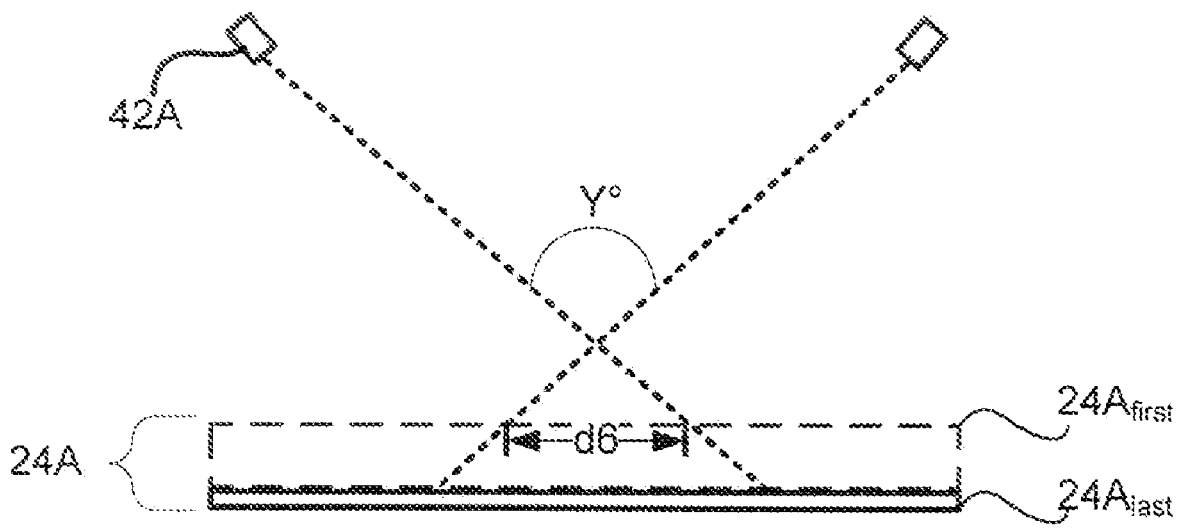

FIGS. 8A and 8B illustrate how the angle between the convergent laser beams affects the sensitivity to variations in thickness. In FIG. 8A, the two laser beams are not highly angled relative to the page 24 surface. FIG. 8A shows the intersection of the convergent laser beams with both the first page 24A$_{first}$ (solid line) and with the last page 24A$_{last}$ (dashed line). As pages accumulate on side 24A, the distance between the projected laser spots decreases and, for the last page 24A$_{last}$, the distance between the laser spots is d5. In FIG. 8B, the two laser beams are more highly angled relative to the page 24 surface. That is, angle Y in FIG. 8B is greater than angle X in FIG. 8A. In this example, the two light pattern sources have also been spread apart farther from each other so that the distance between the laser spots on page 24A$_{first}$ is the same as in FIG. 8A. However, on page 24A$_{last}$ of FIG. 8B, the distance between the projected laser spots d6 is smaller than the distance d5 in FIG. 8A, due to the higher angle. FIGS. 8A and 8B show that the sensitivity of the separation distance of the laser spots with respect to variations in thickness of the document object can be adjusted varying the angle between the laser beams and/or between the laser beams relative to the page. In one embodiment, the position and/or orientation of the laser sources are mechanically adjustable to allow this type of adjustment.

Figure 6B:
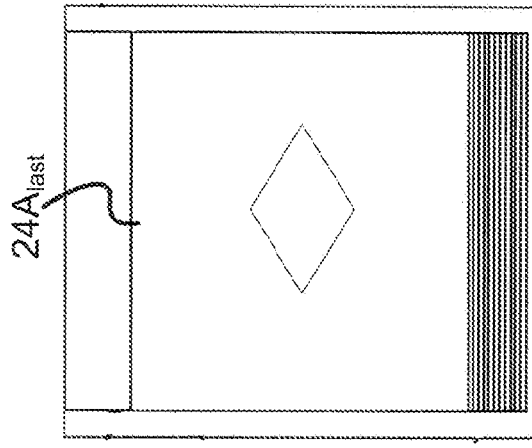
FIGS. 6A and 6B illustrate the use of another light pattern to detect a change in thickness.
Figure 6A:
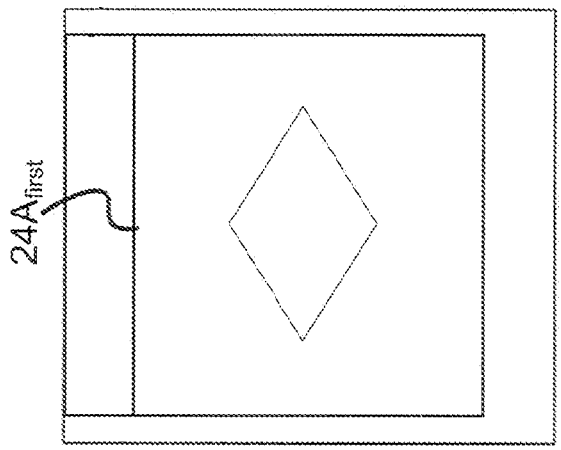

Light patterns other than two projected laser spots can also be used. FIGS. 6A and 6B are examples where the projected light pattern is a diamond that varies in size as a function of the thickness of the document object. This can be achieved by projecting a non-collimated light beam through a diamond-shaped aperture. FIG. 6A shows the side and top view of the first page 24A$_{first}$ being imaged. A large diamond pattern is projected onto page 24A$_{first}$. FIG. 6B shows the side and top view of the last page 24A$_{last}$ being imaged. A smaller diamond is projected onto page 24A$_{last}$. Since the thickness on side 24A has increased, the size of the diamond has changed. Although separated laser spots and a diamond shape were used in the examples above as the projected light patterns, other types of light patterns can also be used so long as the light pattern varies appropriately with the change in thickness between the pages being imaged and the end page. Examples includes shapes other than diamonds, patterns that contain multiple disjoint shapes, and patterns that change shape instead of or in addition to size. Additionally, other types of light pattern sources can also be used, including sources that produce divergent as well as convergent light or laser beams.

Figure 4:
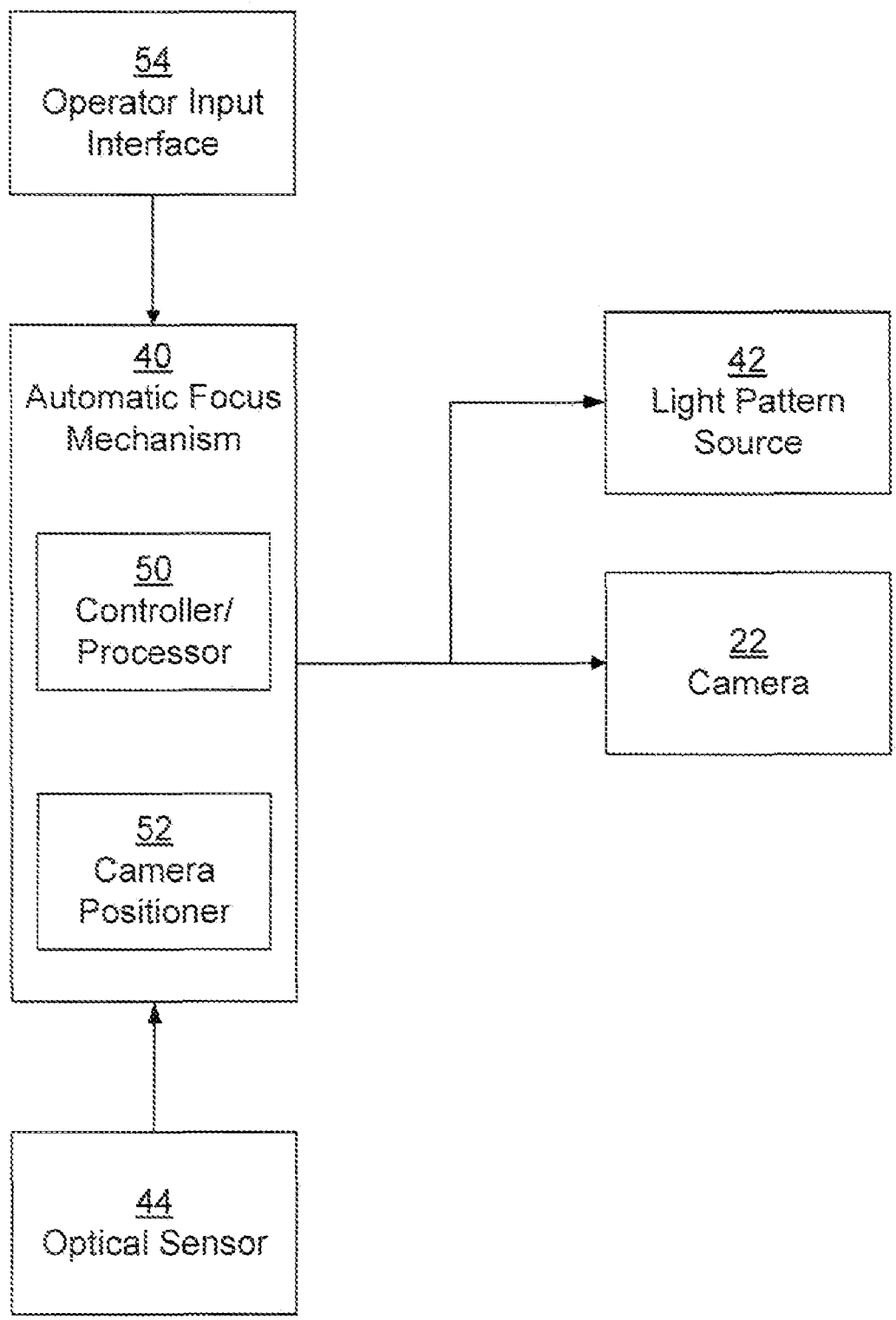
FIG. 4 is a block diagram of an automatic focus document-imaging system.

FIG. 4 is a block diagram of an automatic focus document-imaging system, illustrating some of the functionality and interfaces in the system according to one embodiment. In this example, the automatic focus mechanism 40 includes a controller/processor 50 and a camera positioner 52. The automatic focus mechanism 40 communicates with and/or controls the cameras 22, the optical sensor 44, and optionally also operator input interface 54 and the light pattern source 42.

The operator input interface 52 allows the operator to input certain information. For example, the interface 52 may allow the operator to select the mode of operation for the system. Calibration mode (for calibrating the system), setup mode (for setting up different parameters of the system) and scanning mode (for normal image capture) are common modes that might be implemented. The interface 52 may also be used during regular operation, for example to signal when the operator is scanning a page, or to allow the operator to input the total number of pages and total thickness of a book.

Figure 5:
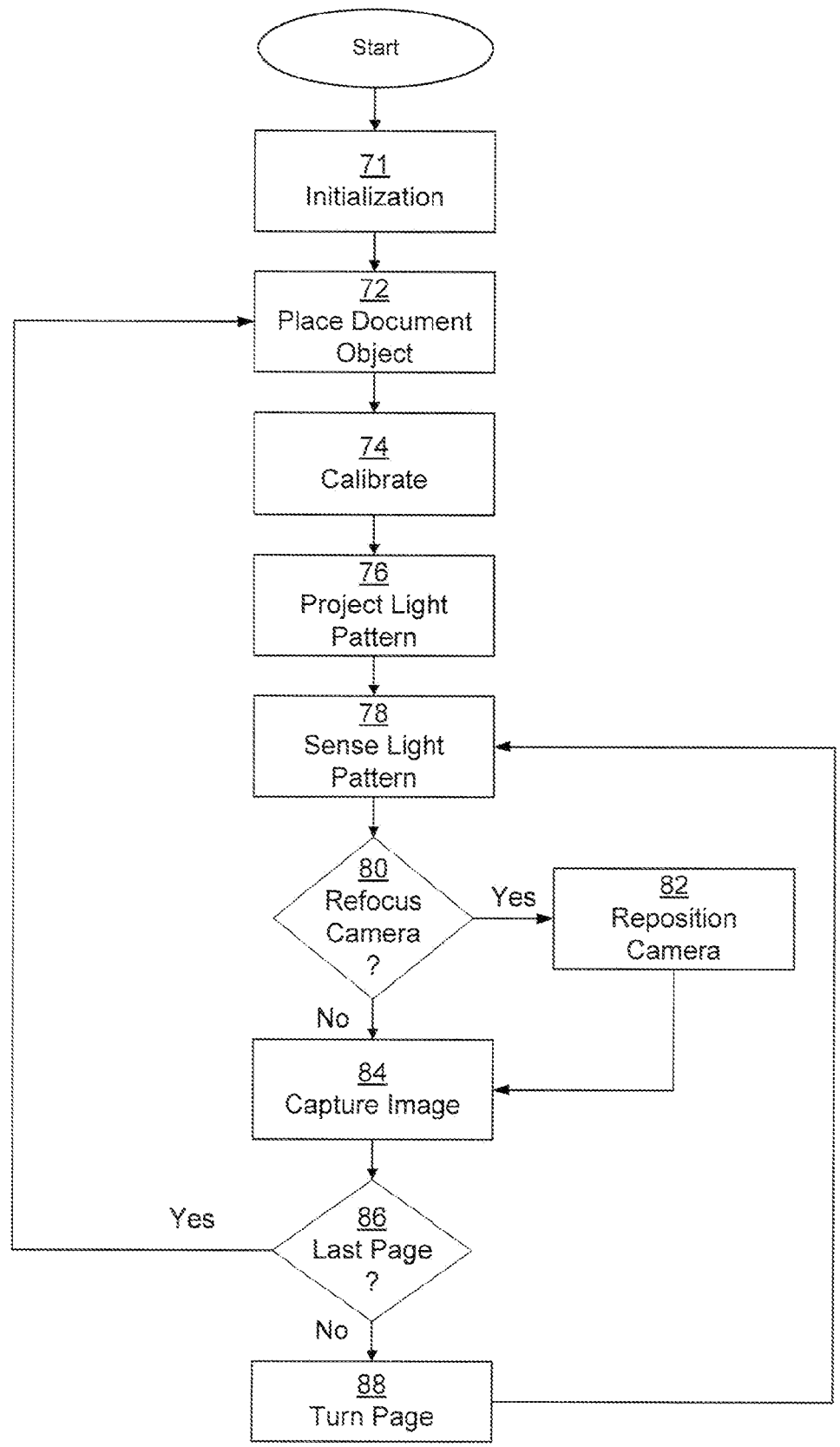
FIG. 5 is a flow diagram of a process for imaging pages of document objects.

FIG. 5 is a flowchart illustrating a process 70 for imaging pages of document objects according to one embodiment. The automatic focus image capturing system 20 is initialized 71. In one embodiment, the cameras 22 are adjusted so that they are focused on the cradle 26. In another embodiment, the light pattern sources 42 are also adjusted so that they project a certain light pattern on the cradle 26. A document object such as a book is placed 72 in the cradle 26. The operator may also secure the book to the cradle using, for example, clips, clamps, and/or magnetic plate inserts inserted inside the front and/or back book covers.

The system 20 captures or receives initial information to facilitate the automatic focus mechanism 40 in calibrating 74 the system. In one embodiment, the light pattern is calibrated according to the book size, e.g., number of pages, width of book, edge locations, etc. Further, in one embodiment, convergent laser beams are used to produce the light pattern and the calibration phase includes adjusting the angles between the laser beams according to the sensitivity of height variation desired by the operator 32. In another embodiment, calibration 74 is done by the operator 32 setting the number of pages desired to be imaged before the camera is refocused. Calibration can also include projecting a light pattern, manually adjusting the camera 22 until it is in focus, and then indicating to the system that the camera 22 is in focus for the projected light pattern.

The imaging process begins with the light pattern source 42 projecting 76 the predetermined light pattern onto a page to be imaged. The optical sensor 44 senses 78 the light pattern projected on the page and passes this information to the automatic focus mechanism 40.

The automatic focus mechanism 40 determines 80 whether to refocus the camera 22. In one embodiment, the controller/processor 50 of the automatic focus mechanism 40 uses the information provided by the optical sensor 44 to determine the distance between the projected laser spots, converts the determined distance to a thickness of separation between the page being imaged and a reference surface (e.g., the last position when the camera was refocused) and then determines whether to refocus the camera 22 based on the thickness of separation. If refocusing is warranted, preferably the controller/processor 50 also determines the amount of refocus. If an adjustment is called for, the controller/processor 50 repositions 82 the camera 22 using the camera positioner 52. In one embodiment, the camera positioner 52 includes a mechanical slide, a motor and a microprocessor. The camera 22 is mounted on the mechanical slide. The microprocessor receives a signal from the controller/processor 50, which can be a digital or voltage signal, and the motor moves the camera 22 along the slide to the location required for the camera to be refocused.

The camera 22 is now in proper focus and an image of the page is captured 84. If the last page to be imaged has not been reached 86, then the page is turned 88 and imaging of pages continues. If the last page has been reached 86, then the document object is removed and a new document object is placed on the cradle 26. The image capturing and page turning may be performed automatically with the use of an automatic page turner and cameras that are automatically triggered. As another example, the operator 32 may trigger the camera 22 to capture an image by depressing a foot pedal 36 and can then manually turn the page.

Figure 7:
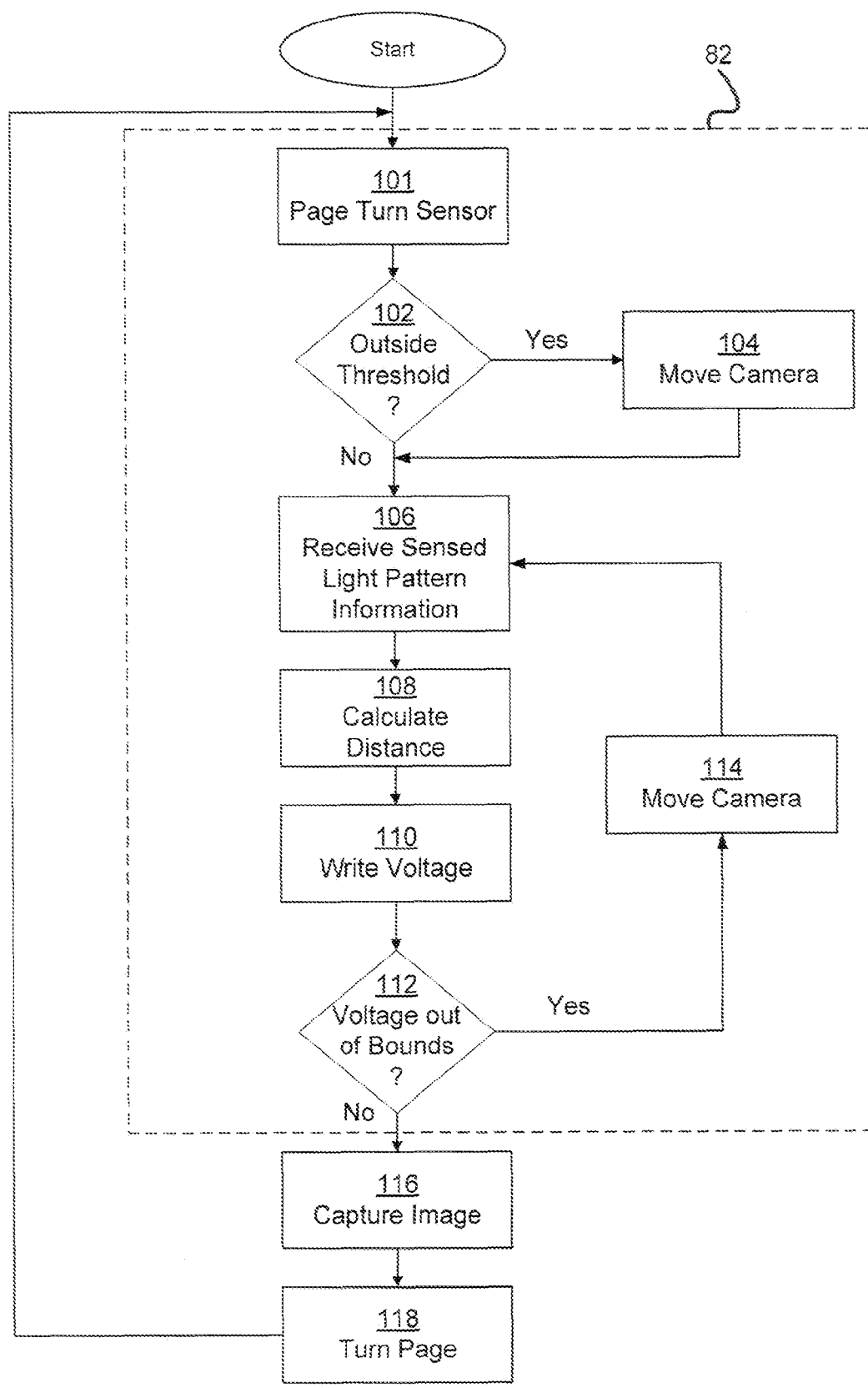
FIG. 7 is a flow diagram of a process for refocusing a camera to image pages of a document object.

FIG. 7 is a flowchart illustrating a process 100 for refocusing a camera 22 for the imaging of a document object according to one embodiment. In this example, steps 101-114 are the detailed steps of refocusing a camera, shown as step 82 in FIG. 5. In this embodiment, steps 101-104 adjust the camera in an open loop fashion without feedback from the projected light pattern. The projected light pattern is used as a backup to check the accuracy of the open loop refocusing. Is should be understood that although both the open loop refocusing method and the projected light pattern refocusing method are used together in this example, each method can be used independently.

At step 101, a page turn sensor that is part of the automatic focus mechanism 40 calculates the number of pages that have been turned. The page turn sensor determines 102 whether the number of pages turned surpasses a set threshold. This threshold could be set by the system or by the operator. If the number of pages that have been turned surpasses the threshold, then it is time to adjust focus of the camera 22. That is, the camera is adjusted in focus once every N pages, where N is the threshold. Alternately, the threshold could be a certain thickness, with the thickness translated to a number of pages by assuming a thickness for each page or by estimating the thickness based on operator input, for example. If the threshold is exceeded, the camera 22 is moved 104 by the camera positioner 52 by a fixed amount to refocus the camera. Note that this is an open loop refocusing.

Steps 106-112 check this refocusing. The controller/processor 50 receives 106 information sensed by optical sensor 44 about the light pattern projected on the page being imaged. The controller/processor 50 uses the information to determine 108 the thickness of the page being imaged relative to a reference surface. Based on the thickness, the controller/processor 50 writes 110 a corresponding analog or digital voltage signal to the camera positioner 52. This voltage signal is used as a backup system in case the open loop adjustment of steps 101-104 is inaccurate and the camera is not refocused properly. The camera positioner 52 determines if the voltage signal is within a certain range. In one embodiment, the range of the acceptable voltage signal is preset and is the same for all document objects imaged. In another embodiment, the range of the acceptable voltage signal is input by the user 32 during calibration. If the voltage signal is out of range 112, the camera positioner 52 moves 114 the camera 22 until the voltage is in range.

Once the voltage signal is in range 112, the page is in proper focus. The camera 22 captures 116 an image of the page. The page is then turned 118. The process 100 then repeats for the next page until the entire document object has been imaged. It must be understood that the page sensor subsystem and the voltage signal subsystem do not need to be used together in order to properly refocus the camera for imaging. In one embodiment, the voltage signal is the only subsystem used to refocus the camera 22 on the page being imaged.

Figure 9A:
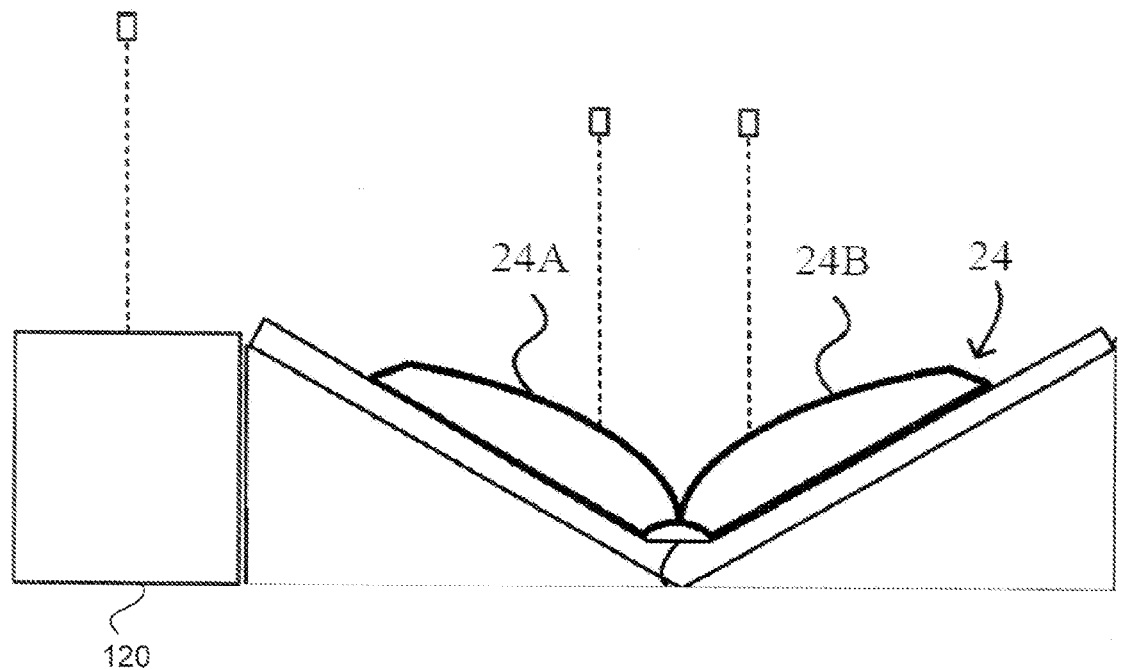
FIGS. 9A and 9B illustrate using a differential measurement to focus the camera.
Figure 9B:
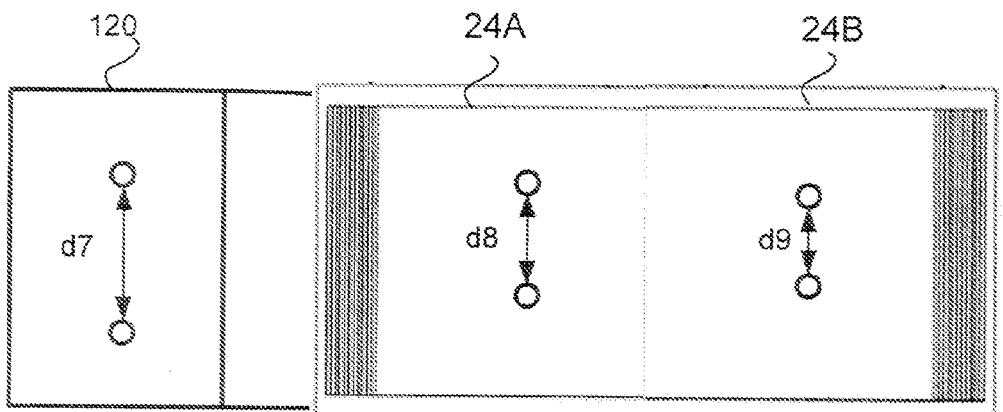

FIGS. 9A and 9B are examples of using a differential measurement to focus the camera according to one embodiment. FIG. 9A shows the side view of convergent laser beams appearing on facing page 24A, 24B, and on a reference 120. In one embodiment, the distance between the laser spots projected onto reference 120 are always the same. Further, in one embodiment, the distance between the laser spots appearing on reference 120 is set during calibration, for example according to the size of the book being imaged.

FIG. 9B shows the top view of the convergent laser beams appearing on facing pages 24A, 24B, and reference 120. In one embodiment, an optical sensor(s) sense the two laser spots on facing page 24A, 24B and reference 120. The automatic focus mechanism compares the sensed light pattern on each page of book 24 to the reference light pattern projected onto reference 120 to determine if the camera 22 for each of the facing pages should be refocused. In other words, the automatic focus adjustment is based on a differential comparison of distance d8 (or d9) to the reference distance d7. In one embodiment, the automatic focus mechanism 40 subtracts the distance between the laser spots d8 from the reference distance d7. The automatic focus mechanism 40 uses the difference between distances d7 and d8 to position the camera of 24A accordingly, so as to maintain page 24A at proper focus. The same process would be done for page 24B, but with distances d7 and d9.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

The invention claimed is:

1. A document-imaging device with automatic focus capability for capturing images of pages of document objects, the device comprising:
   one or more laser sources that project at least two laser beams onto a page of a document object being imaged to produce a predetermined light pattern of two laser spots separated by a distance, where the pages of the document object are separated by different thicknesses from an end page of the document object and the distance between the two laser spots varies as a function of the separation of the page from the end page;
   an optical sensor that senses the two laser spots projected onto the page being imaged; and
   an automatic focus mechanism that:
      determines the distance between the two sensed laser spots;
      converts the determined distance to a separation of the page from a reference surface; and
      focuses an image capture device on the page being imaged based on the separation of the page from the reference surface.

2. The document-imaging device of claim 1, wherein the light pattern is projected onto the page within a field of view of the image capture device but the light pattern has a wavelength spectrum that falls outside a spectral sensitivity of the image capture device.

3. The document-imaging device of claim 2, wherein the image capture device operates in the visible spectrum, and the one or more laser sources and the optical sensor operate in the infrared spectrum.

4. The document-imaging device of claim 1, wherein the laser sources are adjustable with respect to an angle of propagation of the laser beams relative to the page.

5. The document-imaging device of claim 1, wherein the laser beams lie substantially within a plane and, in the projection on that plane, the laser beams intersect before they are incident on the page of the document object, regardless of the thickness of the document object.

6. The document-imaging device of claim 1, wherein the document object is a bound document with a binding and the two laser spots are aligned parallel to the binding of the bound document.

7. The document-imaging device of claim 1, wherein:
   the optical sensor comprises an image array onto which the laser spots are imaged, the optical sensor having pixels that are smaller than the image of the laser spots; and
   the automatic focus mechanism estimates a center of each laser spot to sub-pixel resolution and calculates the distance between the two estimated centers.

8. The document-imaging device of claim 1, wherein the automatic focus mechanism focuses the image capture device after a predetermined number of pages have been imaged.

9. The document-imaging device of claim 8, wherein the automatic focus mechanism allows a user to set the predetermined number of pages.

10. The document-imaging device of claim 1, further comprising:
    a mechanical slide on which the image capture device is mounted to allow movement of the image capture device towards or away from the document object, where the automatic focus mechanism focuses the image capture device by moving the image capture device along the mechanical slide.

11. The document-imaging device of claim 10, wherein a size of the image of the page is maintained as the image capture device is moved along the mechanical slide.

12. The document-imaging device of claim 1, wherein the automatic focus mechanism focuses the image capture device by adjusting optics within the image capture device without changing a location of the image capture device.

13. The document-imaging device of claim 1, further comprising:
    one or more additional laser sources that project at least two additional laser beams onto a second page of the document object to produce a second predetermined light pattern of two additional laser spots separated by a second distance, where the distance between the two additional laser spots varies as a function of the separation of the second page from a second end page of the document object;
    a second optical sensor that senses the two additional laser spots; and
    a second automatic focus mechanism that:
       determines the second distance between the two sensed additional laser spots;
       converts the determined second distance to a separation of the second page from a second reference surface; and
       focuses a second image capture device on the second page being imaged based on the separation of the second page from the second reference surface.

14. The document-imaging device of claim 1, further comprising:
    a document holder for holding the document object in a predetermined position relative to the one or more laser sources and within a field of view of the image capture device.

15. The document-imaging device of claim 1, wherein the automatic focus mechanism is capable of focusing to a resolution of one to two millimeters.

16. A method for automatically focusing an image capture device on a page of a document object, the method comprising:
    projecting at least two laser beams onto a page of a document object being imaged to produce a predetermined light pattern of two laser spots separated by a distance, where the pages of the document object are separated by different thicknesses from an end page of the document object and the distance between the two laser spots varies as a function of the separation of the page from the end page;
    sensing the two laser spots projected onto the page being imaged;
    determining the distance between the two sensed laser spots;
    converting the determined distance to a separation of the page from a reference surface; and
    focusing an image capture device on the page being imaged based on the separation of the page from the reference surface.

17. The method of claim 16, further comprising:
calibrating an automatic focus mechanism, that focuses the image capture device, before projecting the predetermined light pattern onto the page of the document object being imaged.

18. The method of claim 16, wherein the light pattern is projected onto the page within a field of view of the image capture device but in a wavelength spectrum that falls outside a spectral sensitivity of the image capture device.

19. A document-imaging device with automatic focus capability for capturing images of pages of document objects, the device comprising:
- an image capture device operating in the visible spectrum to capture images of pages of a document object being imaged;
- a mechanical slide on which the image capture device is mounted to allow movement of the image capture device towards or away from the document object being imaged;
- one or more infrared laser sources that project two infrared laser beams onto a page of the document object being imaged to produce two infrared laser spots separated by a distance, where the pages of the document object are separated by different thicknesses from an end page of the document object and the distance between the two infrared laser spots varies as a function of the separation of the page from the end page; the two infrared laser beams lying substantially within a plane and, in the projection on that plane, the laser beams intersecting before they are incident on the page of the document object, regardless of the thickness of the document object;
- an infrared image array, onto which the infrared laser spots are imaged; and
- an automatic focus mechanism coupled to the infrared image array; the automatic focus mechanism estimating a center of each infrared laser spot to sub-pixel resolution, calculating a distance between the two estimated centers; and, based on the calculated distance, moving the image capture device along the mechanical slide to focus the image capture device on the page being imaged, wherein a size of the images of pages of the document object maintained as the image capture device is moved along the mechanical slide.

* * * * *